3,349,120
DEHYDROCHLORINATION OF ALKYL CHLORIDES

Philip Lusman, Edinburgh, Scotland, assignor, by mesne assignments, to British Hydrocarbon Chemicals Limited, London, England
No Drawing. Filed May 1, 1964, Ser. No. 364,323
Claims priority, application Great Britain, May 6, 1963, 17,794/63
8 Claims. (Cl. 260—505)

The present invention relates to the production of olefines by the dehydrochlorination of alkyl chlorides.

The conversion of chlorinated paraffins to olefines by dehydrochlorination in the vapor phase over a catalyst is known. With many catalysts skeletal isomerisation takes place during the dehydrochlorination reaction, forming branched chain olefines, and this is disadvantageous for instance where it is desired to obtain primarily straight chain olefines, for use in the production of detergent alkylate or plasticiser alcohols. In our copending application Ser. No. 293,861 is described the process for the production of olefines which comprises passing a chlorinated normal paraffin having from 4 to 20 carbon atoms in the vapor phase over a silica catalyst which has been pre-treated with alkali; the alkali pre-treatment of the catalyst prevents or reduces skeletal isomerisation during the dehydrochlorination reaction.

It has now been discovered that skeletal isomerisation over an untreated silica gel catalyst can be prevented or reduced by passing the chlorinated paraffin over the catalyst at a high flow rate.

According to the present invention the process for the production of olefines comprises passing a chlorosubstituted paraffin having from 4 to 20 carbon atoms in the vapor phase over a silica gel catalyst at a flow rate in the range from 5 to 30 liquid volumes of chlorinated paraffin per volume of catalyst per hour.

A particularly suitable starting material is the reaction product of the chlorination of a normal paraffin having from 4 to 20 carbon atoms, consisting of a mixture of the alkyl chloride with unconverted paraffin. As there is a tendency for skeletal isomerisation to increase and for the proportion of di-, tri-, and polychloro compounds formed to rise when the paraffin chlorination conversion is increased, it is preferred that the degree of chlorination of such reaction mixtures should be kept relatively low, for example below about 40%.

The flow rate of the chlorinated paraffins in the vapor phase over the catalyst is between 5 and 30 and preferably between 8 and 20 liquid volumes of chlorinated paraffin per volume of catalyst per hour.

Silica gels of relatively large average pore diameters are preferred, gels with average pore diameters over about 40° A. generally giving less side reactions, especially less cracking.

The dehydrochlorination is suitably carried out at temperatures in the range 200–500° C. preferably 300–400° C. Atmospheric pressure, or increased or reduced pressures can be used. Diluents, such as lower paraffins or inert gases such as nitrogen can be used, the unconverted paraffin present in a partially chlorinated product being generally a suitable diluent. Some carbon is deposited on the catalyst during dehydrochlorination, and this eventually deactivates the catalyst, which therefore is regenerated at intervals with air or oxygen-containing gases to burn off the carbon. It is an advantage of the process of this invention that carbon deposition as a proportion of the feed is reduced, and considerably larger amounts of feedstock can therefore be processed per unit weight of catalyst between regenerations.

In a preferred embodiment of the invention the feedstock is first processed over a relatively large bed, and therefore at a low flow rate, of a silica catalyst which has been pre-treated with alkali as described in our copending application Ser. No. 293,861 so obtaining an incomplete conversion with minimum skeletal isomerisation, and then over a relatively small bed, and therefore at a high flow rate, of the silica gel catalyst of the present invention. This process allows for the maximum possible conversion of the chlorinated paraffin feed with the least amount of skeletal isomerisation.

The olefines produced by the process can be recovered using conventional means. In cases where paraffin chlorination products are fed to the process and an olefine-paraffin mixture is produced, this mixture can be fed directly (if desired after removal of a very small amount of high boiling by-product which is sometimes formed) to the process for which the olefine is required. The alkylation of the olefine to benzene and the conversion of the olefine to alcohols using the "OXO" process are cases where the olefine/paraffin mixture can be directly utilised in this way.

An important application of the process of the present invention is in the dehydrochlorination of chlorinated paraffins (especially normal paraffins) in the $C_9$–$C_{18}$ range, preferably in the $C_{10}$–$C_{16}$ range, to produce olefinic products suitable for alkylation to aromatic hydrocarbons such as benzene, using conventional alkylation catalysts, to give detergent alkylate for use in the production of biodegradable sulphonate detergents, for instance as described in B.P. 950,975. In this case, the dehydrochlorinated product, including any paraffin not converted in the chlorination step, can be fed directly to the alkylation step where the olefine is combined with benzene and the unconverted paraffin is recovered from the alkylation step and returned to the chlorination.

The process of the present invention is further illustrated with reference to the following examples.

Example 1

A sample of silica gel of the following properties

| | |
|---|---|
| Surface area | m.$^2$/gm__ 300 |
| Average pore volume | ml./gm__ 1.04 |
| Average pore diameter | A__ 139 |
| Sodium content | wt. percent__ 0.2 | was used to dehydrochlorinate a feedstock made by chlorinating a $C_{10}$–$C_{13}$ normal paraffin fraction to a chlorine content of about 3.8 wt. percent, the conditions and results being summarised in the following table:

TABLE 1

| Weight percent chlorine in feed | Dehydrochlorination Temp., ° C. | Pressure | Liquid flow rate, vol./vol. cat./hr. | Relative conc. of branched isomers in product | Percent conversion of chloroparaffin |
|---|---|---|---|---|---|
| 3.82 | 350 | Atm. | 0.7 | 17 | 99.5 |
| 3.82 | 350 | Atm. | 3.3 | 6 | 99.5 |
| 3.82 | 350 | Atm. | 8.2 | 2 | 98.7 |
| 3.57 | 370 | Atm. | 20.0 | 1 | 95.3 |

The branched isomer contents were determined by hydrogenating the products on a palladium oxide/charcoal catalyst at 20–60° C., which completely converted the olefines to paraffins. The hydrogenated product was then analysed gas chromatographically.

The paraffin/olefines mixture produced at a flow rate of 20 v./v./hour was alkylated to benzene using anhydrous hydrofluoric acid as catalyst, the mole ratios of olefine: benzene:HF being 1:10:20. The detergent alkylate fraction of the product had a refractive index ($n_d^{20}$) of 1.483 indicating the essentially straight chain character of the side chains. The yield of detergent alkylate was about 120 parts per part of normal paraffin consumed.

*Example 2*

A $C_{10}$–$C_{13}$ normal paraffin feedstock containing 98.6 wt. percent of normal paraffins was chlorinated to give a chlorine content of 4.22 wt. percent. This chlorinated product was passed over a silica gel catalyst as in Example 1 at a rate of 20 liquid volumes per volume of catalyst per hour at a temperature of 370° C. and at atmospheric pressure. In this test 97% of the chlorine content of the feed was eliminated as hydrogen chloride. The total product from the test was used to alkylate benzene, using anhydrous hydrogen fluoride as catalyst, the mole ratios of olefine:benzene:HF being 1:10:20. The alkyl benzene product was recovered from the total alkylation products by fractionation under reduced pressure after separation and removal of the catalyst, the alkyl benzene boiling in the range 270° C. to 320° C. at 760 mm. pressure.

The alkyl benzene was sulphonated in the conventional way with oleum, and the sodium salt tested for biodegradability by measuring the disappearance of active agent when incubated with a standard culture and when aerated under standard conditions. The results, compared with those for a sulphonate derived from the same chloro paraffins dehydrochlorinated at a lower space velocity (0.7 v./v./hr.) over the same catalyst, were as follows:

TABLE 2

| Space velocity in dehydro-chlorination, v./v./hour | Percent active agent remaining after 22 days | |
|---|---|---|
| | Aeration test | Incubation test |
| 0.7 | 21.2 | 12.5 |
| 20 | 4.3 | 3.1 |

The product made by dehydrochlorination at 20 v./v./hour is clearly much more biodegradable than that made at the low space velocity.

*Example 3*

A chlorinated $C_{10}$–$C_{13}$ normal paraffin mixture containing 4.2 wt. percent of chlorine was dehydrochlorinated over the silica gel catalyst of Example 1 at a flow rate of 20 volumes liquid feed per volume of catalyst per hour, the temperature being 370° C. and the pressure atmospheric. The chlorine content of the total liquid product was determined at intervals during the test, and the percentage of the chlorine initially present in the feed which was removed calculated. The results were as follows:

TABLE 3

| Lbs. alkyl chloride processed per pound of catalyst | Wt. percent of chlorine in the product | Wt. percent of feed chlorine content eliminated |
|---|---|---|
| 46 | 0.14 | 96.8 |
| 83 | 0.15 | 96.6 |
| 122 | 0.17 | 96.1 |
| 155 | 0.21 | 95.2 |
| 190 | 0.25 | 94.4 |
| 226 | 0.35 | 92.1 |
| 262 | 0.39 | 91.3 |

These figures show that considerable amounts of feed can be processed over the catalyst under these conditions before any large decline in catalyst activity necessitating regeneration by burning off the carbon takes place.

I claim:
1. In a process for the production of olefins which comprises passing a chloro-substituted paraffin having from 4 to 20 carbon atoms over a silica catalyst at a temperature in the range of from 200° C. to 500° C., the improvement which comprises suppressing skeletal isomerization by contacting the chloro-substituted paraffin with an untreated silica gel catalyst at a flow rate in the range of 5 to 30 liquid volumes of chlorinated paraffin per volume of catalyst per hour.
2. The improvement according to claim 1 wherein the starting material is the reaction product of the chlorination of a normal paraffin.
3. The improvement according to claim 2 wherein the degree of chlorination of the paraffin in the reaction product is below 40 mole percent.
4. The improvement according to claim 1 wherein the flow rate is in the range from 8 to 20 liquid volumes of chlorinated paraffin per volume of catalyst per hour.
5. The improvement according to claim 1 wherein the catalyst is a silica gel having an average pore diameter over about 40 A. units.
6. In a process for the production of olefins which comprises passing a chloro-substituted paraffin having from 4 to 20 carbon atoms over a silica catalyst at a temperature in the range of from 200° C. to 500° C., the improvement which comprises suppressing skeletal isomerization by partially dehydrochlorinating the chloro-substituted paraffin by first contacting said paraffin with a silica catalyst at a flow rate below 5 liquid volumes of chlorinated paraffin per volume of catalyst per hour and thereafter contacting said paraffin with a silica catalyst at a flow rate in the range of 5 to 30 liquid volumes of chlorinated paraffin per volume of catalyst per hour.
7. The improvement according to claim 6 wherein the silica catalyst with which the chloro-substituted paraffin is contacted at a flow rate below 5 liquid volumes of chlorinated paraffin per volume of catalyst per hour has been pre-tested with alkali.
8. In a process for the production of alkylbenzene sulphonate detergent which comprises chlorinating a paraffin feedstock to produce chloro-paraffins, dehydrochlorinating the chloro-paraffins to produce olefins, alkylating benzene with the olefins so produced in the presence of an alkylation catalyst and sulphonating the resulting alkylate, the improvement which comprises suppressing skeletal isomerization by using a paraffin feedstock in the range $C_{10}$–$C_{16}$ which contains at least 95% normal paraffins and dehydrochlorinating the chloro-paraffins to olefins by passing the chloro-paraffins over a silica gel catalyst at a flow rate in the range of 5 to 30 liquid volumes of chlorinated paraffin per volume of catalyst per hour.

References Cited

UNITED STATES PATENTS

| 1,995,827 | 3/1935 | Thomas | 260—671 |
| 2,597,910 | 5/1952 | Thaw et al. | 260—677 |
| 2,708,210 | 5/1955 | Sias | 260—677 |
| 2,920,122 | 6/1960 | Milton et al. | 260—677 |
| 3,169,987 | 2/1965 | Bloch | 260—671 X |

DELBERT E. GANTZ, *Primary Examiner.*

C. R. DAVIS, *Assistant Examiner.*

UNITED STATES PATENT OFFICE
CERTIFICATE OF CORRECTION

Patent No. 3,349,120

October 24, 1967

Philip Lusman

It is hereby certified that error appears in the above numbered patent requiring correction and that the said Letters Patent should read as corrected below.

In the heading to the printed specification, line 9, for "17,794/63" read -- 17,799/63 --.

Signed and sealed this 18th day of March 1969.

(SEAL)
Attest:

Edward M. Fletcher, Jr.
Attesting Officer

EDWARD J. BRENNER
Commissioner of Patents